United States Patent
Nallathambi et al.

(10) Patent No.: US 11,826,919 B2
(45) Date of Patent: Nov. 28, 2023

(54) WORK COORDINATE GENERATION DEVICE

(71) Applicant: FUJI CORPORATION, Chiryu (JP)

(72) Inventors: Anusuya Nallathambi, Chiryu (JP); Hiroshi Oike, Chiryu (JP); Hirotake Esaki, Ichinomiya (JP); Takahiro Morikawa, Chiryu (JP)

(73) Assignee: FUJI CORPORATION, Chiryu (JP)

(*) Notice: Subject to any disclaimer, the term of this patent is extended or adjusted under 35 U.S.C. 154(b) by 200 days.

(21) Appl. No.: 17/426,857

(22) PCT Filed: Jan. 30, 2019

(86) PCT No.: PCT/JP2019/003221
§ 371 (c)(1),
(2) Date: Jul. 29, 2021

(87) PCT Pub. No.: WO2020/157875
PCT Pub. Date: Aug. 6, 2020

(65) Prior Publication Data
US 2022/0111530 A1    Apr. 14, 2022

(51) Int. Cl.
*G05B 15/00* (2006.01)
*G05B 19/00* (2006.01)
(Continued)

(52) U.S. Cl.
CPC ......... *B25J 9/1697* (2013.01); *B25J 19/023* (2013.01); *G05B 19/4183* (2013.01); *G06T 7/70* (2017.01);
(Continued)

(58) Field of Classification Search
CPC ... B25J 9/1697; B25J 19/023; G05B 19/4183; G05B 2219/39393; G05B 2219/40564;
(Continued)

(56) References Cited

U.S. PATENT DOCUMENTS

| | | | | |
|---|---|---|---|---|
| 6,681,151 | B1* | 1/2004 | Weinzimmer | B25J 9/1697 356/243.1 |
| 2012/0259462 | A1* | 10/2012 | Aoba | B25J 9/1697 901/46 |

(Continued)

FOREIGN PATENT DOCUMENTS

| | | |
|---|---|---|
| JP | 2011-110627 A | 6/2011 |
| WO | WO 2018/230517 A1 | 12/2018 |

OTHER PUBLICATIONS

International Search Report dated Apr. 16, 2019 in PCT/JP2019/003221 filed on Jan. 30, 2019 (2 pages).

*Primary Examiner* — Harry Y Oh
(74) *Attorney, Agent, or Firm* — Oblon, McClelland, Maier & Neustadt, L.L.P.

(57) ABSTRACT

A work coordinate generation device includes a shape register section configured to register shape information about a shape of a work region optically defined on a target which is a work target of a work robot; a first recognition section configured to acquire first image data; a first coordinate generation section configured to generate a first work coordinate which represents the work region of the first target based on a result of recognition of the first recognition section; a second recognition section configured to acquire second image data; and a second coordinate generation section configured to generate a second work coordinate which represents the work region of the second target based on the first work coordinate and a result of recognition of the second recognition section.

13 Claims, 9 Drawing Sheets

(51) Int. Cl.
| | |
|---|---|
| *B25J 9/16* | (2006.01) |
| *G06T 7/70* | (2017.01) |
| *G06V 10/20* | (2022.01) |
| *B25J 19/02* | (2006.01) |
| *G05B 19/418* | (2006.01) |

(52) U.S. Cl.
CPC .. *G06V 10/255* (2022.01); *G05B 2219/39393* (2013.01); *G05B 2219/40564* (2013.01); *G06T 2207/30164* (2013.01)

(58) Field of Classification Search
CPC ............ G05B 2219/39392; G06T 7/70; G06T 2207/30164; G06V 10/255
See application file for complete search history.

(56) References Cited

U.S. PATENT DOCUMENTS

2014/0288711 A1* 9/2014 Sawada .................. B25J 9/1671
700/259
2016/0005161 A1* 1/2016 Aiso .................... G06V 10/772
382/153

* cited by examiner

WORK COORDINATE GENERATION DEVICE

TECHNICAL FIELD

The present description relates to a device that generates work coordinates which represent a work region of a target that is a work target of a work robot.

BACKGROUND ART

Work robots are widely used in order to promote automation and labor saving at factories and business establishments. Many work robots are equipped with an end effector that acts on a target that is a work target or holds a workpiece. In addition, many work robots image a target by using a camera, acquire work coordinates which represent a work region of the target, and proceed with the work. One example of technology relating to the acquisition of such work coordinates is disclosed in Patent Literature 1.

The robot control method disclosed in Patent Literature 1 includes a first image processing step of obtaining an initial position at which a marker can be imaged from image data acquired by imaging a work target object with a portable camera, an initial movement step of moving a robot hand to an initial position, and a second image processing step of detecting a position error of the marker from the image data acquired by imaging the marker with a compact camera of the robot hand. According to this method, a teaching work in which an operator operates a teaching pendant or the like to repeat the change of the position of the robot hand is not necessary, and thus the load on the operator is reduced.

PATENT LITERATURE

Patent Literature 1: JP-A-2011-110627

BRIEF SUMMARY

Technical Problem

Incidentally, in Patent Literature 1, the accurate position of the marker is detected by imaging twice, and the subsequent works can be made unmanned. As a precondition for this, the positional relationship between the work region on the target and the marker is known based on CAD information of the target (work target object). Stated another way, as a condition, in the local coordinate system on the target, the work coordinates which represent the work region or the position coordinates of the marker are represented by known fixed values. Accordingly, the technology disclosed in Patent Literature 1 cannot be applied in a case in which detailed information such as the CAD information of the target is not disclosed or in a case in which the marker is not attached to the target.

For example, there would be a case in which an actual object of the target is supplied without the CAD information attached thereto, and shape information about the shape of the work region is attached thereto. In this case, the operator manually measures the actual target with a caliper or the like to set the work coordinates on the target. Alternatively, the operator performs the teaching work for operating the teaching pendant as disclosed in Patent Literature 1. Both the manual measurement and the teaching work have the problems of time and efforts. In addition, there is a possibility that a setting error or an operation error by the operator may occur.

In addition, there may be a case in which there are individual differences in the arrangement positions of the work regions in multiple targets, or there may be a case in which there is a position error in the carry-in position of the target. In these cases, even in a case in which the work coordinates are required in the local coordinate system on the target, it is difficult to generate the work coordinates represented by the reference coordinate system of the work robot for each target.

The present description is to provide a work coordinate generation device that can generate work coordinates represented by a reference coordinate system of a work robot for each target by using shape information about a shape of a work region even in a case in which the work coordinate of a local coordinate system which represents the work region on the target is not known.

Solution to Problem

The present description discloses a work coordinate generation device including a shape register section configured to register shape information about a shape of a work region optically defined on a target which is carried in a work performing position to be a work target of a work robot, a first recognition section configured to acquire first image data by imaging a first target, which is carried in, with a camera and search for at least a part of a region in the first image data by using the shape information to recognize information about a position of the work region of the first target, a first coordinate generation section configured to generate a first work coordinate which represents the work region of the first target based on a result of recognition of the first recognition section, a second recognition section configured to acquire second image data by imaging a second target, which is carried in, with the camera and search for a region in the second image data, which is narrower than the region searched by the first recognition section to recognize information about a position of the work region of the second target, and a second coordinate generation section configured to generate a second work coordinate which represents the work region of the second target based on the first work coordinate and a result of recognition of the second recognition section.

Advantageous Effects

In the work coordinate generation device disclosed in the present description, the first work coordinate can be generated by registering the shape information about the shape of the work region on the target, and searching for the first image data of the first target by using the shape information. In addition, the second work coordinate can be generated by searching for the narrow region in the second image data of the second target. Further, the work coordinates of the third and subsequent targets can be generated in the same manner as in the second target. Therefore, even in a case in which the work coordinate in the local coordinate system which represents the work region on the target is not known, the work coordinate represented by the reference coordinate system of the work robot can be generated for each target.

DESCRIPTION OF EMBODIMENTS

1. Configuration of Work Robot 1

First, a configuration of work robot 1 to which a work coordinate generation device according to a first embodiment is applied will be described with reference to FIGS. 1 and 2. Work robot 1 performs a work on work region 81 (see FIG. 3) of multiple targets 8 which are sequentially carried in a work performing position. Examples of the content of the work include an arrangement work of components and a wiring work of electric circuits, but are not limited to this. In work robot 1, a reference coordinate system in which the X-axis and the Y-axis are orthogonal to each other in the horizontal surface is determined. Work robot 1 operates based on coordinates represented by the reference coordinate system.

Figure 1:
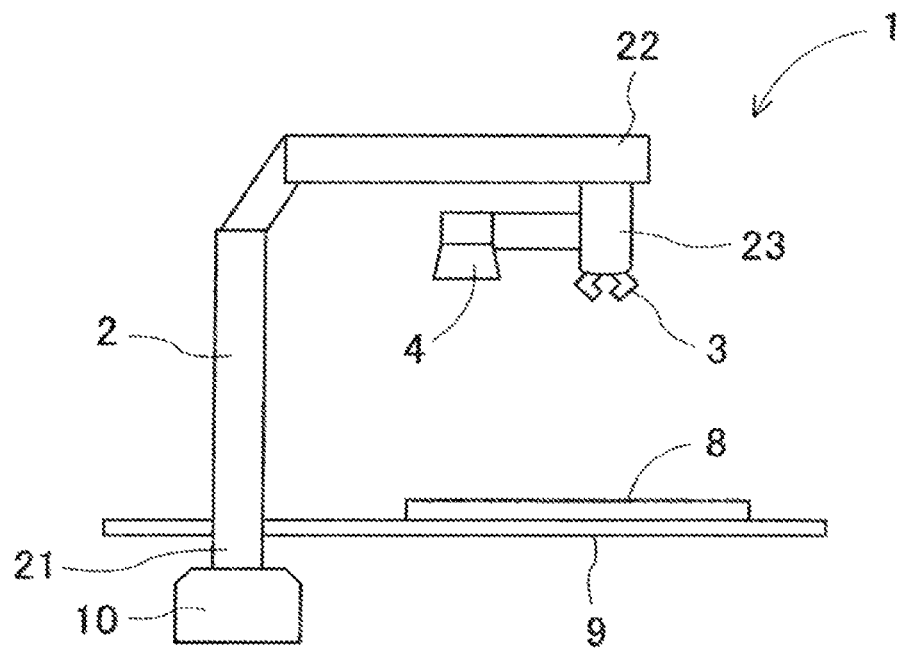
FIG. 1 is a front view schematically showing a configuration of a work robot to which a work coordinate generation device according to a first embodiment is applied.
Figure 2:
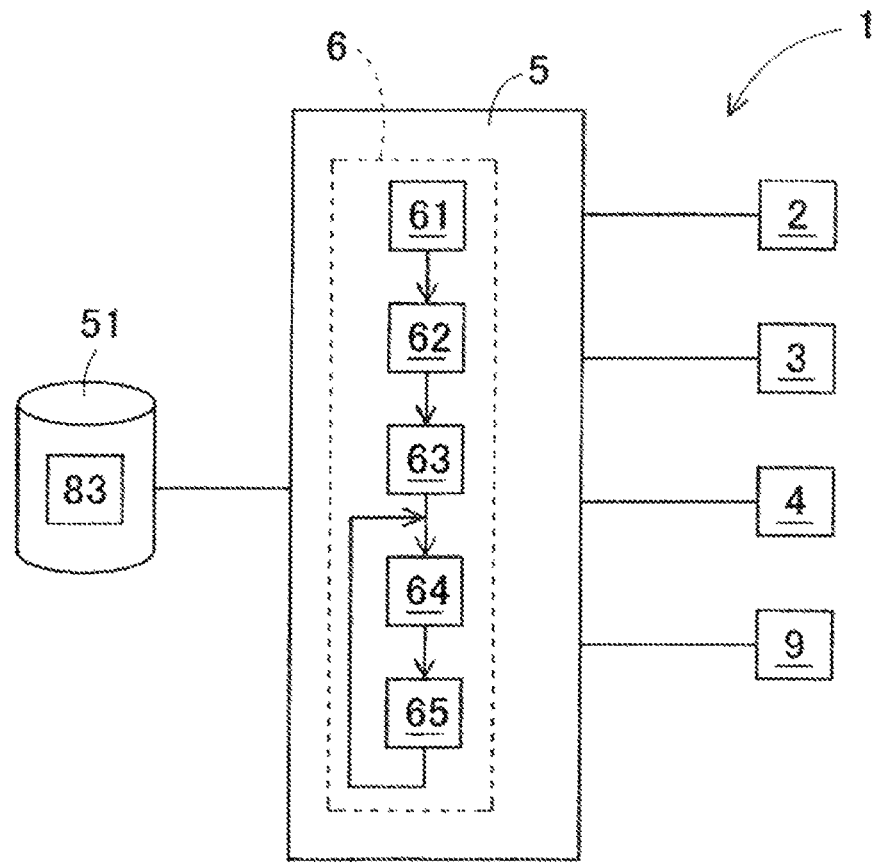
FIG. 2 is a block diagram showing a functional configuration of the work coordinate generation device.

As shown in FIGS. 1 and 2, work robot 1 includes base section 10, moving device 2, end effector 3, camera 4, conveyance line 9, control device 5, and the like. Base section 10 is fixedly attached to face the work performing position. Moving device 2 is configured by an arm of an articulated type. Arm base end section 21 of moving device 2 is supported by the upper side of base section 10 and is configured to be rotatable around the vertical axis. In addition, moving device 2 (arm) can extend in any direction, and is configured to be freely bent midway in the longitudinal direction. Accordingly, arm distal end section 22 of moving device 2 can move to any spatial position above the work performing position. Hand section 23 is provided on arm distal end section 22. Moving device 2 moves end effector 3 and camera 4 to be aligned with each other.

End effector 3 is provided on hand section 23. End effector 3 is configured to be suitable for work. For example, a chuck that grips a component is used as end effector 3 that performs the arrangement work of the component. As end effector 3 that performs the wiring work of the electric circuit, a driver that screws the connection terminal, a solder iron that solders the connection terminal, or the like is used. End effector 3 may be attached with sensors that detect a state of target 8, a progress state of the work, or the like.

Camera 4 is provided on hand section 23. Camera 4 acquire image data by imaging target 8 carried in the work performing position. The image data is subjected to the image processing, so that work region 81 on target 8 is recognized. Camera 4 may also be used for reading individual identification information attached to target 8.

Conveyance line 9 is provided to automatically carry target 8 in and out of the work performing position. The conveyance path of conveyance line 9 extends through the work performing position. Conveyance line 9 includes a conveyor belt that rotates along the conveyance path in a state in which target 8 is placed, a drive source that drives the conveyor belt, and the like. It should be noted that target 8 may be manually carried in and out of the work performing position without providing conveyance line 9.

2. Shape of Target 8

Figure 3:
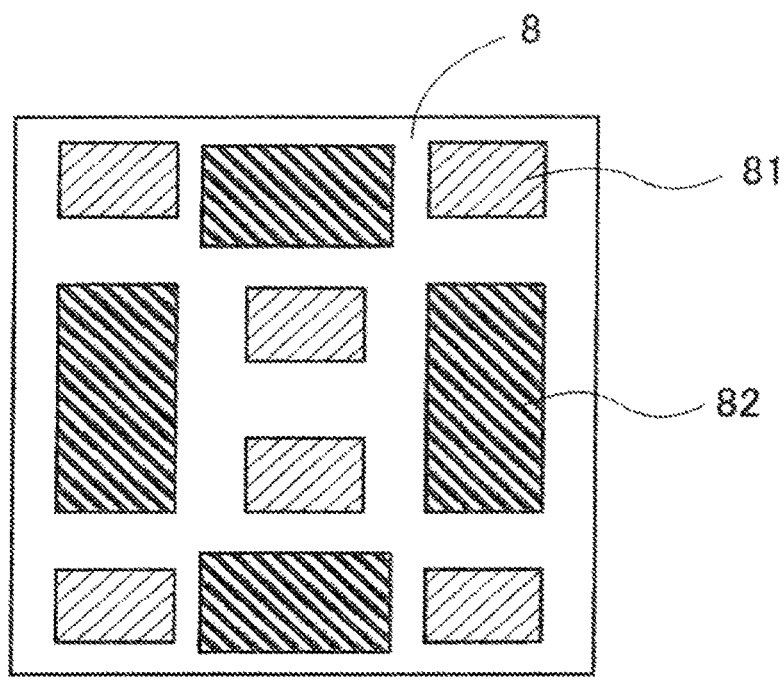
FIG. 3 is a plan view of a target used in the first embodiment.

Next, a shape of target 8 will be described. As shown in FIG. 3, target 8 is a rectangular plate-shaped member. On the upper surface of target 8, work region 81 and non-work region 82 are optically defined. Specifically, work region 81 is defined to have a color or brightness different from the background color of target 8. In addition, non-work region 82 is defined to have a color or brightness different from the background color of target 8 and that of work region 81. In FIG. 3, work region 81 is indicated by hatching with thin lines for convenience. Non-work region 82 is indicated by hatching with thick lines for convenience.

Six work regions 81 are rectangular and all have the same shape and the same size. Work region 81 is a region in which work robot 1 performs the work. In addition, four non-work regions 82 have a rectangular shape larger than work region 81, and all have the same shape and the same size. Non-work region 82 is a work region in a case in which same target 8 is a work target of another work robot. It should be noted that non-work region 82 may be multiple types which have different shapes or sizes. The positions of work region 81 and non-work region 82 are represented by using the work coordinates corresponding to the positions of the center points or specific vertices of the region.

There are individual differences in the arrangement positions of work regions 81 in multiple targets 8. That is, an error occurs in the work coordinate represented by the local coordinate system on target 8. Further, a position error may occur in the carry-in position of target 8 carried in the work performing position by conveyance line 9. In addition, a rotation error may occur in the orientation of target 8 in the horizontal surface.

In the first embodiment, the shape and the size of target 8 are known. Further, it has been known that camera 4 can be used to capture an entire image of target 8. On the other hand, the number of regions of work region 81 on target 8 and the work coordinates of the local coordinate system which represents work region 81 are not known. Then, a document that describes information about the shape of work region 81 is owned by an operator. The information about the shape is, for example, information 1) to 4) as follows.

1) "rectangular" which represents the shape of work region 81
2) vertical dimension of work region 81
3) horizontal dimension of work region 81
4) area of work region 81

Under such a condition, work coordinate generation device 6 is used for the purpose of determining the position at which work robot 1 performs the work.

3. Configuration of Work Coordinate Generation Device 6 According to First Embodiment Next, a configuration of work coordinate generation device 6 according to the first embodiment will be described. As shown in FIG. 2, control device 5 controls moving device 2, end effector 3, camera 4, and conveyance line 9. Control device 5 is configured by a computer device. Work coordinate generation device 6 according to the first embodiment is realized by software of control device 5. Work coordinate generation device 6 includes five functional sections, that is, shape register section 61, first recognition section 62, first coordinate generation section 63, second recognition section 64, and second coordinate generation section 65.

Shape register section 61 registers shape information 83 about the shape of work region 81 optically defined in target 8. Specifically, shape register section 61 presents first image data acquired by first recognition section 62 to the operator, and registers shape information 83 in accordance with the designation of the operator (described in detail below). Shape information 83 is data which is registered in storage device 51 of control device 5, stated another way, is limited to information in an electronic form. Accordingly, the information described in the document owned by the operator does not correspond to shape information 83. The image data acquired by imaging work region 81 or the template in an electronic form generated by processing the image data corresponding to shape information 83.

First recognition section 62 images first target 8, which is carried in, with camera 4 to acquire the first image data described above. Further, first recognition section 62 searches for at least a part of the region in the first image data by using shape information 83 to recognize information about the position of work region 81 of first target 8. First coordinate generation section 63 generates first work coordinate which represents work region 81 of first target 8 based on the result of recognition of first recognition section 62. Here, the position at which camera 4 performs imaging is indicated by a reference coordinate system. Accordingly, the first work coordinate and a second work coordinate which will be described below can be represented by the reference coordinate system.

Second recognition section 64 images second target 8, which is carried in, with camera 4 to acquire the second image data. Further, second recognition section 64 searches for the region in the second image data, which is narrower than the region searched by first recognition section 62 to recognize information about the position of work region 81 of second target 8. The region narrower than the region searched by first recognition section 62 means a region in the second image data in the vicinity of the first work coordinate. Then, second recognition section 64 first searches for the position represented by the first work coordinate as a priority search position. In a case in which work region 81 is unknown at the priority search position, second recognition section 64 performs the search while gradually moving away from the priority search position, and finally recognizes work region 81.

Second coordinate generation section 65 generates second work coordinate which represents work region 81 of second target 8 based on the first work coordinate and the result of recognition of second recognition section 64. Actually, second coordinate generation section 65 corrects the first work coordinate to generate the second work coordinate. Each function of the five functional sections will be described in the following operation flow.

4. Operation of Work Coordinate Generation Device 6 of First Embodiment

Figure 4:
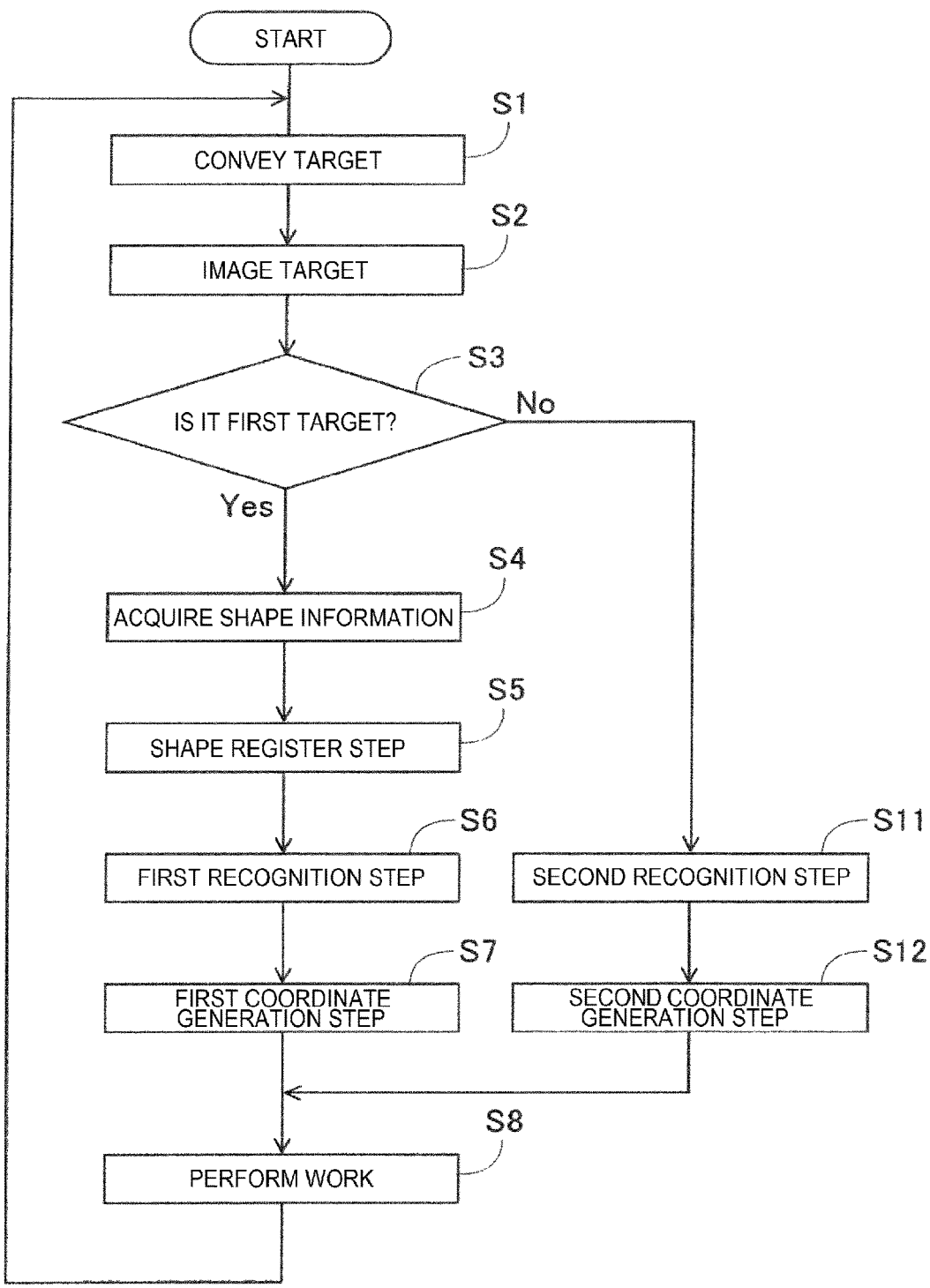
FIG. 4 is a diagram of an operation flow of a control device, which shows the operation of the work coordinate generation device.

Next, the operation of work coordinate generation device 6 according to the first embodiment will be described. The operation flow shown in FIG. 4 is executed under the control of control device 5 which includes work coordinate generation device 6. In step S1 in FIG. 4, control device 5 controls conveyance line 9 to convey target 8. In step S1 of first time, first target 8 is carried in.

In following step S2, first recognition section 62 or second recognition section 64 images target 8, which is carried in, with camera 4 to acquire the image data. In step S2 of first time, first recognition section 62 images first target 8 with camera 4 to acquire first image data (D11 and D12) (see FIGS. 5 and 6). In following step S3, work coordinate generation device 6 determines whether or not first target 8 is a target. Since first target 8 is the target in step S3 of first time, the execution of the operation flow proceeds to step S4.

In step S4, shape register section 61 acquires shape information 83. There are two types of acquisition methods, and both methods involve the operator. In a first acquisition method, shape register section 61 recognizes the shapes of work region 81 and non-work region 82 which are optically defined in first image data D11, and presents the recognized shapes to the operator. As the recognition method, an image processing technology using a blob detecting algorithm, an edge detecting algorithm, or the like is appropriately used.

Figure 5:
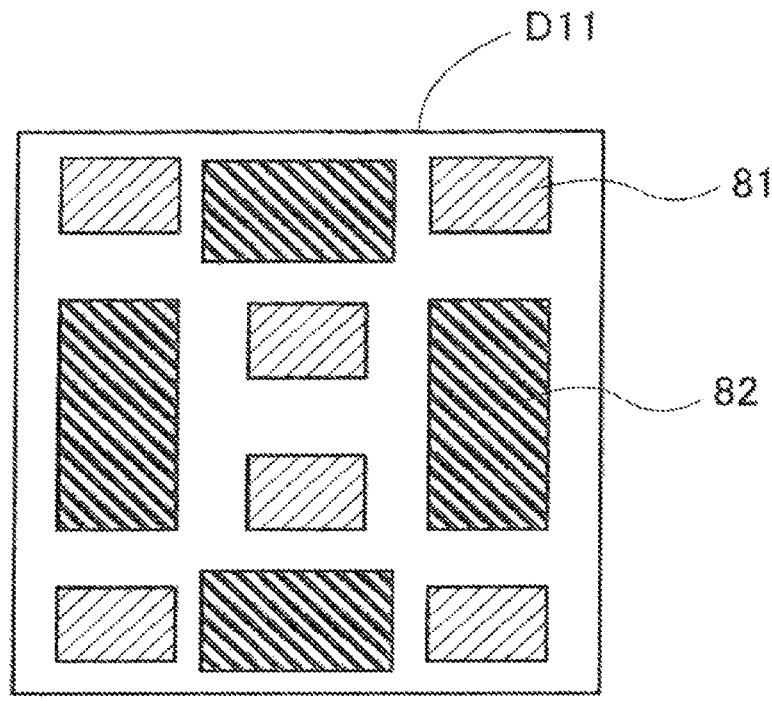
FIG. 5 is a diagram conceptually showing a first acquisition method by which a shape register section acquires shape information.

FIG. 5 shows first image data D11 presented to the operator. As for the display on the drawing, first image data D11 coincides with the plan view of target 8 shown in FIG. 3. At this point in time, the shapes of work region 81 and non-work region 82 are already recognized, and the boundary lines of the regions are indicated by solid lines. The operator designates work region 81 in first image data D11 with reference to the information described in the owned document. For example, the operator can designate work region 81 by moving a cursor into work region 81 and performing a click operation. Shape register section 61 acquires the designated work region 81.

It should be noted that the operator need not designate all six work regions 81, but need only designate at least one work region 81. In a case in which multiple work regions 81 are designated, shape register section 61 can acquire shape information 83 obtained by averaging the errors between the shapes of the work regions 81. In a case in which one work region 81 is designated, shape register section 61 can acquire shape information 83 which coincides with the shape of work region 81.

Figure 6:
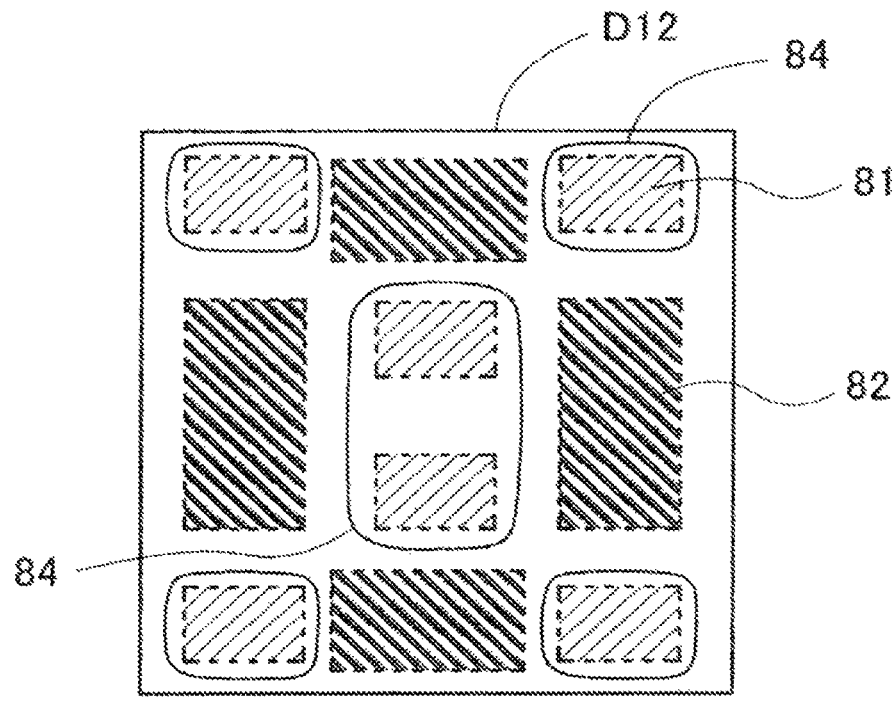
FIG. 6 is a diagram conceptually showing a second acquisition method by which the shape register section acquires the shape information.

In a second acquisition method, shape register section 61 presents first image data D12 to the operator as it is. FIG. 6 shows first image data D12 presented to the operator. At this point in time, the shapes of work region 81 and non-work region 82 are not recognized, and the boundary lines of the regions are not indicated. The operator designates a range including work region 81 in first image data D12 with reference to the information described in the owned document. For example, the operator designates the range by using closed curve 84 drawn by moving the cursor to circle around work region 81.

In FIG. 6, all six work regions 81 are designated by using five closed curves 84. Shape register section 61 recognizes and acquires the shape of work region 81 that is present in closed curve 84. As the recognition method in this case, an image processing technology similar to that of the first acquisition method is used. It should be noted that the operator need not designate the ranges of all six work regions 81, but need only designate the ranges of at least one work region 81. Shape register section 61 can acquire shape information 83 obtained by averaging the errors between the shapes of multiple work regions 81. Alternatively, shape register section 61 can acquire shape information 83 which coincides with the shape of one work region 81.

Figure 7:
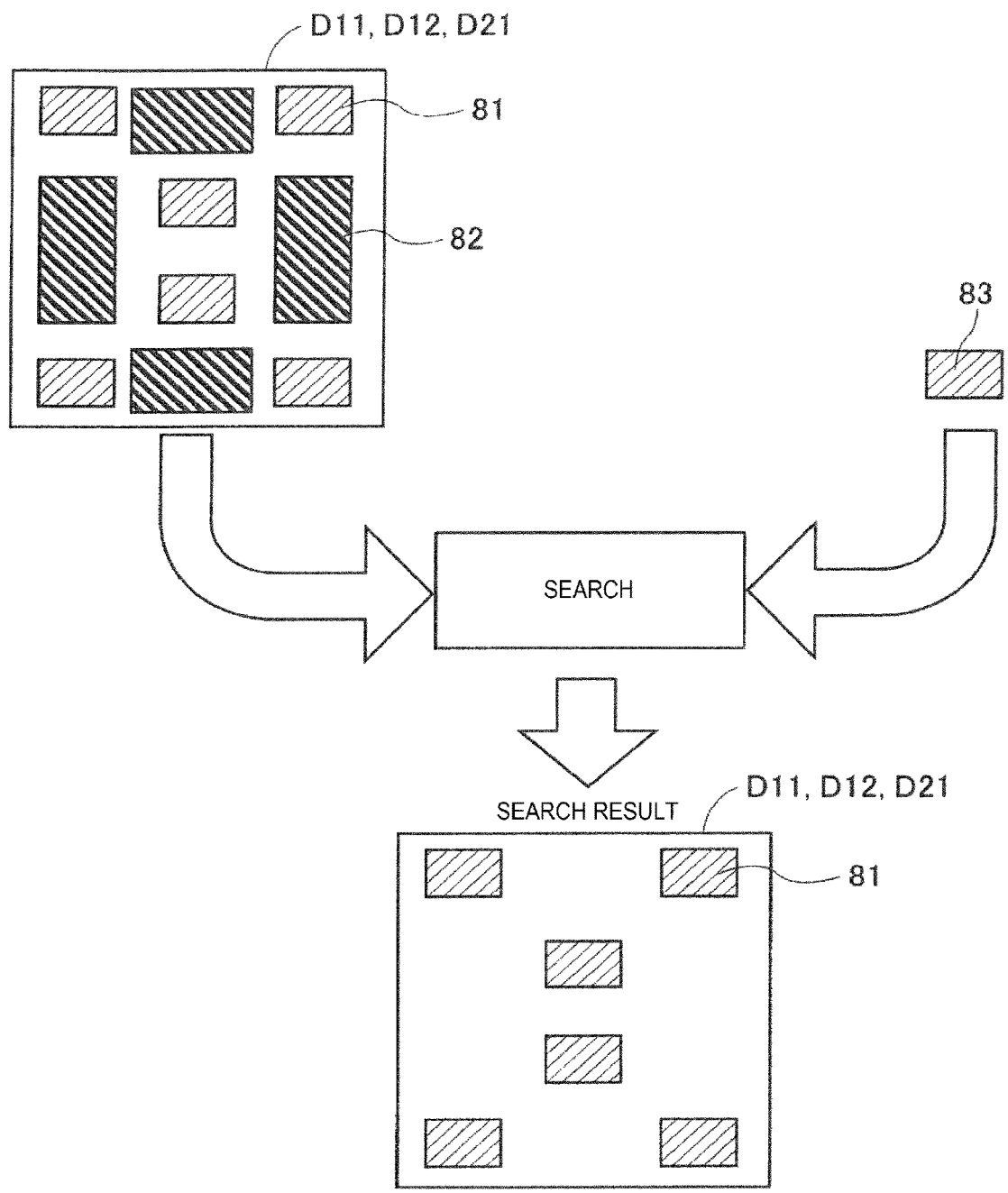
FIG. 7 is a diagram schematically showing operations and effects of the work coordinate generation device.

In following shape register step S5, shape register section 61 registers the acquired shape information 83 in storage device 51. In following first recognition step S6, first recognition section 62 searches for at least a part of the region in first image data (D11 and D12) by using shape information 83, as shown in FIG. 7. Specifically, first recognition section 62 first generates a template corresponding to shape information 83. Next, first recognition section 62 moves the template in first image data (D11 and D12) to search for work region 81 which coincides with the template.

At this point in time, the number and the position of work regions 81 on target 8 are not known. Accordingly, first recognition section 62 needs to search for all the regions in first image data (D11 and D12). As a result, first recognition section 62 can recognize the positions of all six work regions 81. As a matter of course, non-work region 82 does not coincide with the template and is excluded.

In following first coordinate generation step S7, first coordinate generation section 63 generates six first work coordinates which represent work region 81 of first target 8. In following step S8, work robot 1 performs the work based on the six first work coordinates. After that, the execution of the operation flow is returned to step S1.

In step S1 of second time, first target 8 for which the work has been completed is carried out, and second target 8 is carried in. In step S2 of second time, second recognition section 64 images second target 8 with camera 4 to acquire second image data D21. In step S3 of second time, since second target 8 is the target, the execution of the operation flow proceeds to second recognition step S11.

In second recognition step S11, second recognition section 64 searches for a narrow region in second image data D21 by using shape information 83, as shown in FIG. 7. At this point in time, the number and the position of work regions 81 on target 8 are approximately known from the six first work coordinates of the first target. Accordingly, it is sufficient for second recognition section 64 to search for a narrow region in second image data D21 in the vicinity of the first work coordinate.

In a case in which the individual differences in the arrangement positions of the work regions 81 in multiple targets 8 and the position error between the carry-in positions in conveyance line 9 are negligibly small, second recognition step S11 is not necessary. That is, the priority search position corresponding to the first work coordinate is directly set to the second work coordinate. Even in a case in which the individual difference or the position error described above is not negligible, second recognition section 64 can recognize work region 81 in a short time by searching for a narrow region while gradually moving away from the priority search position corresponding to the first work coordinate.

In following second coordinate generation step S12, second coordinate generation section 65 generates six second work coordinates which represent work region 81 of second target 8. At this time, second coordinate generation section 65 can correct the first work coordinate by an amount corresponding to the individual difference or the position error described above to generate the second work coordinate. After second coordinate generation step S12 is executed, the execution of the operation flow is merged in step S8, so that the work by work robot 1 is performed. After that, the execution of the operation flow is returned to step S1.

In step S1 of third time, second target 8 for which the work has been completed is carried out, and third target 8 is carried in. Similar to the case of second target 8, second recognition step S11 and second coordinate generation step S12 are repeatedly executed on third and subsequent targets 8.

In work coordinate generation device 6 according to the first embodiment, the first work coordinate can be generated by registering shape information 83 about the shape of work region 81 on target 8, and searching for first image data (D11 and D12) of first target 8 by using shape information 83. Further, the second work coordinate can be generated by searching for a narrow region in second image data D21 of second target 8. Further, the work coordinates of third and subsequent targets 8 can be generated in the same manner as in second target 8. Accordingly, even in a case in which the work coordinate in the local coordinate system which represents work region 81 on target 8 is not known, the work coordinate represented by the reference coordinate system of work robot 1 can be generated for each target 8.

Further, the operator need only simply designate shape information 83 before starting the work of work robot 1. The generation of the work coordinate is automatically executed by the work coordinate generation device 6. Accordingly, the work coordinates can be generated with a short deal of effort of the operator. In addition, the possibility of the operator setting error or the operation error is reduced. Further, even in a case in which a long time is required since the search for first image data (D11 and D12) is performed in the entire area, the search for second image data D21 may be performed in a narrow region, so that a short time is required. Accordingly, the work coordinates of second and subsequent targets 8 are generated in a short time. As a result, the work efficiency of work robot 1 is improved.

5. Work Coordinate Generation Device 6 According to Second Embodiment

Figure 8:
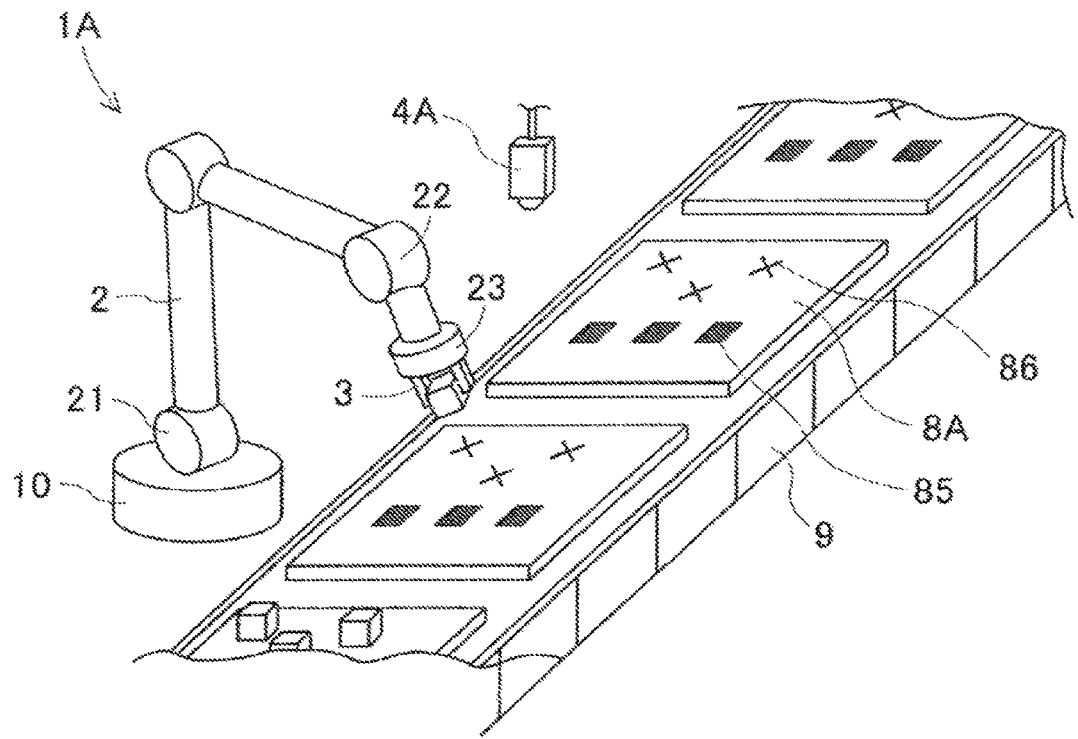
FIG. 8 is a perspective view schematically showing a configuration of a work robot to which a work coordinate generation device according to a second embodiment is applied.

Next, work coordinate generation device 6 according to a second embodiment will be described mainly with respect to points different from the first embodiment. As shown in FIG. 8, in work robot 1A applied to the second embodiment, camera 4 is not provided in hand section 23. Fixed camera 4A is used instead of camera 4. Fixed camera 4A is separate from work robot 1A and is suspended from the ceiling and fixed. It should be noted that fixed camera 4A may be fixed at a position other than the ceiling. Fixed camera 4A is not affected by the movement or vibration of moving device 2, the position thereof is stabilized, and thus the image data which is clear and has high positional accuracy can be acquired.

Figure 9:
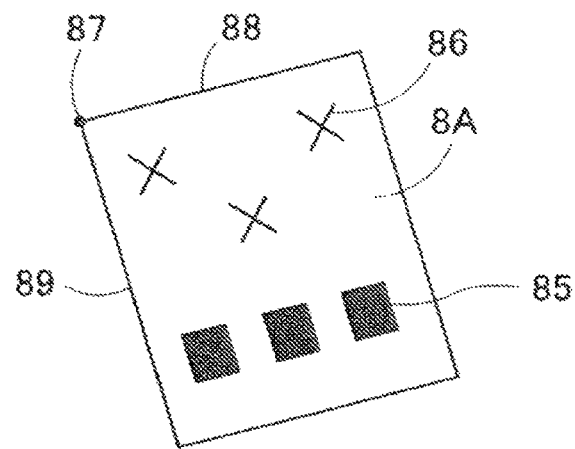
FIG. 9 is a plan view of a target used in the second embodiment.

Further, as shown in FIG. 9, target 8A used in the second embodiment is a rectangular plate-shaped member. Three work regions 85 indicated by black rectangles and three non-work regions 86 indicated by x marks are defined on the upper surface of target 8A. In the second embodiment, the individual differences in the arrangement positions of work regions 85 of multiple targets 8A are negligibly small. However, a position error may occur in the carry-in position of target 8A which is carried in the work performing position by conveyance line 9. In addition, the orientation of target 8A may have a rotation error in the horizontal surface.

In the second embodiment, the shape and the size of target 8A are known. Further, it has been known that an entire image of target 8A can be captured by using fixed camera 4A. On the other hand, the number of regions of work region 85 on target 8A and the work coordinate of the local coordinate system which represents work region 85 are not known. The operator holds shape information 83 about the shape of work region 85 in an electronic form as known design information of target 8A. Under such a condition, work coordinate generation device 6 of the second embodiment is used.

Work coordinate generation device 6 according to the second embodiment uses a relative coordinate system based on the carry-in position of first target 8A in addition to the reference coordinate system determined in work robot 1A.

That is, the origin of the relative coordinate system is displaced from the origin of the reference coordinate system. Nevertheless, the condition is satisfied that the x-axis and the y-axis of the relative coordinate system are each parallel to the X-axis and the Y-axis of the reference coordinate system. Hereinafter, the coordinates of the reference coordinate system are denoted by using uppercase letters X and Y, and the coordinates of the relative coordinate system are denoted by using lowercase letters x and y. The work coordinate which represents work region 85 is assumed to be the coordinate of the center point of the region of work region 85.

The position of the origin of the relative coordinate system is determined as the position of reference point 87 when first target 8A is carried in. Reference point 87 is set at an upper left end portion in FIG. 9, in which short side 88 and long side 89 of the outer shape of target 8A intersect with each other. The position of reference point 87 of target 8A is obtained by recognizing the shape of target 8A by the image processing of first recognition section 62 and second recognition section 64. Further, the rotational orientation of target 8A is obtained by recognizing the extending direction of at least one of short side 88 and long side 89 by the image processing of first recognition section 62 and second recognition section 64.

Work coordinate generation device 6 according to the second embodiment includes shape register section 61, first recognition section 62, first coordinate generation section 63, second recognition section 64, and second coordinate generation section 65, similarly to the first embodiment. However, some of the functions of these five functional sections are different from those of the first embodiment. Shape register section 61 registers shape information 83 based on the known design information of target 8A.

First recognition section 62 searches for the first image data in the same manner as in the first embodiment to recognize work region 85 of first target 8A. Further, first recognition section 62 recognizes a first carry-in position of reference point 87 of first target 8A and the first rotation angle of first target 8A. First coordinate generation section 63 generates the first work coordinate of the reference coordinate system in the same manner as in the first embodiment. Further, first coordinate generation section 63 generates a relative first work coordinate by converting the first work coordinate into the relative coordinate system.

Second recognition section 64 does not perform the search of the first embodiment for recognizing three work regions 85 by using shape information 83. Instead, second recognition section 64 searches for a region in the second image data in the vicinity of the first carry-in position, and recognizes a second carry-in position of reference point 87 of second target 8A and the second rotation angle of second target 8A. As a result, the number of positions in which the search using the image processing technology is performed is one instead of three. Therefore, the time required for the search is greatly shortened.

Second coordinate generation section 65 calculates a relative second work coordinate of the relative coordinate system which represents the work region of second target 8A by using the relative first work coordinate, the position error which is the difference between the first carry-in position and the second carry-in position, and the rotation error which is the difference between the first rotation angle and the second rotation angle. Further, second coordinate generation section 65 generates the second work coordinate of the reference coordinate system by converting the relative second work coordinate into the reference coordinate system. The functions of the five functional sections will be described in detail using examples in the following operation flow.

Figure 10:
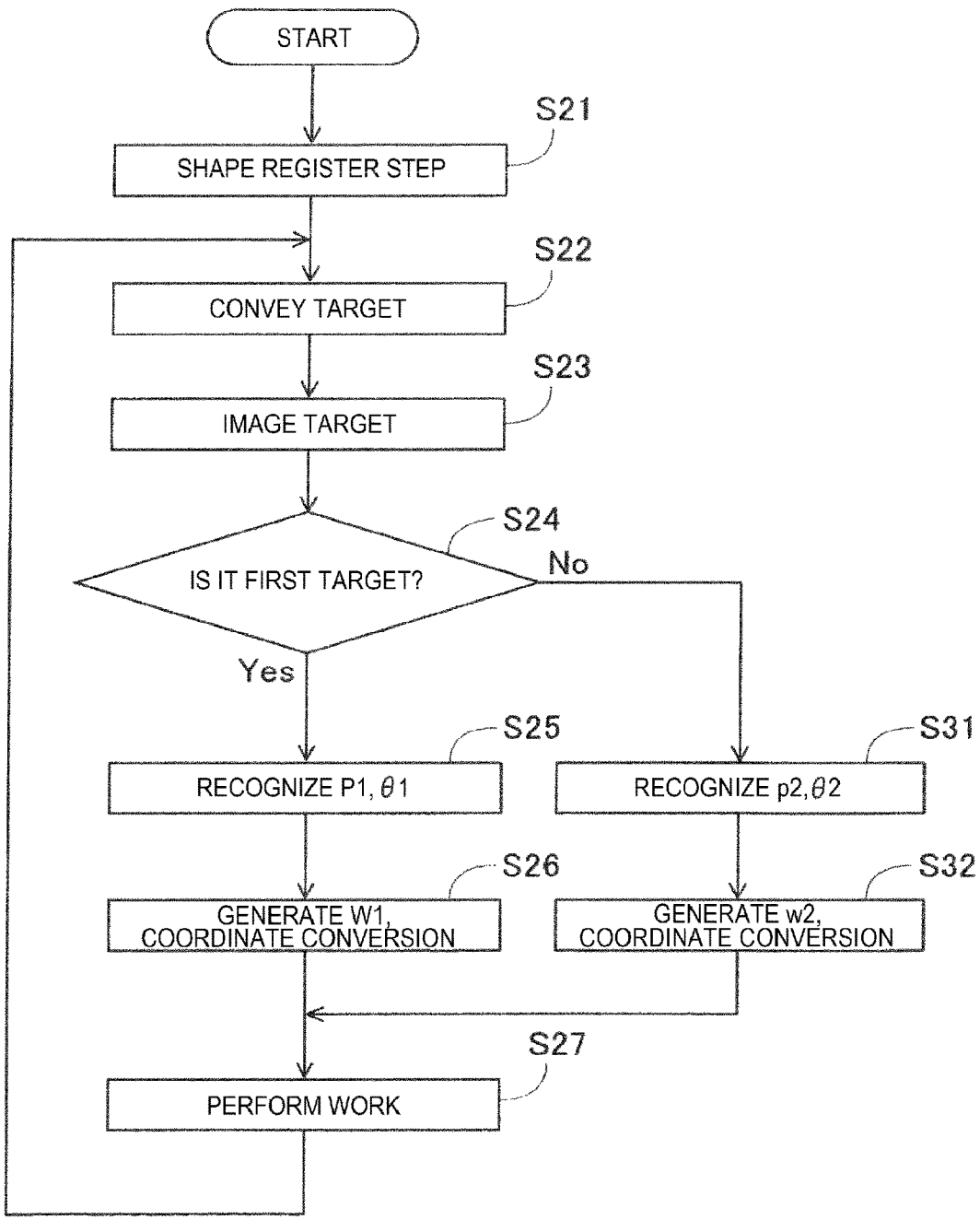
FIG. 10 is an operation flow diagram showing the operation of the work coordinate generation device according to the second embodiment.

The operation flow shown in FIG. 10 is executed under the control of control device 5 including work coordinate generation device 6. In shape register step S21 in FIG. 10, the operator inputs shape information 83 which is held to control device 5. Shape register section 61 registers shape information 83 which is input in storage device 51. In following step S22, control device 5 controls conveyance line 9 to convey target 8A. In step S22 of first time, first target 8A is carried in.

Figure 11:
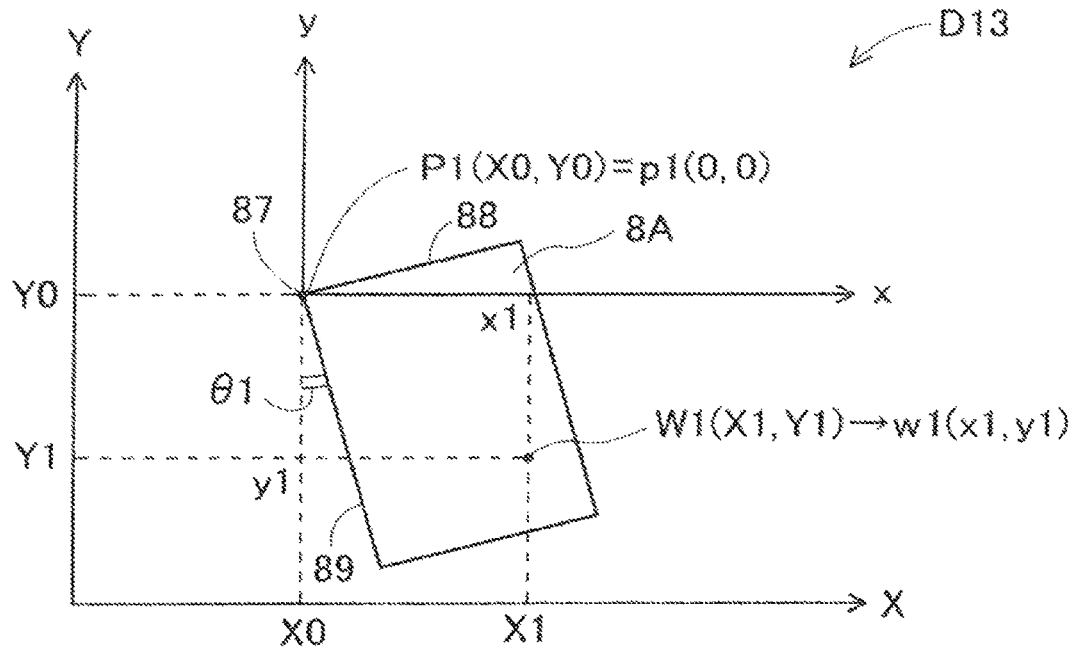
FIG. 11 is a graph of first image data showing an example of a first carry-in position of a first target.

In following step S23, first recognition section 62 or second recognition section 64 images target 8A, which is carried in, with camera 4 to acquire the image data. In step S23 of first time, first recognition section 62 images first target 8A with fixed camera 4A to acquire first image data D13 shown in FIG. 11. In following step S24, work coordinate generation device 6 determines whether or not first target 8A is a target. In step S24 of first time, since first target 8A is the target, the execution of the operation flow proceeds to step S25.

In step S25, first recognition section 62 recognizes all three work regions 85 by the same method as in the first embodiment. First recognition section 62 further recognizes first carry-in position P1 of reference point 87 of first target 8A and first rotation angle θ1 of first target 8A. In the example shown in FIG. 11, first carry-in position P1 of reference point 87 is denoted as first carry-in position P1 (X0, Y0) by using the reference coordinate system. First carry-in position P1 (X0, Y0) is the origin of the relative coordinate system, and is denoted as first carry-in position p1 (0, 0) by using the relative coordinate system. In the examples shown in FIG. 11 and FIG. 12, three work regions 85 are not shown in order to solve the complexity, and only work coordinates (W1, w1, W2, and w2) of one work region 85 on the right are shown.

In following step S26, first coordinate generation section 63 generates first work coordinate W1 (X1, Y1) of the reference coordinate system in the same manner as in the first embodiment. Further, first coordinate generation section 63 generates relative first work coordinate w1 (x1, y1) by converting first work coordinate W1 (X1, Y1) into the relative coordinate system. This coordinate conversion is performed by Equation 1 below.

$$\begin{pmatrix} x1 \\ y1 \end{pmatrix} = \begin{pmatrix} X1 \\ Y1 \end{pmatrix} - \begin{pmatrix} X0 \\ Y0 \end{pmatrix} \quad \text{[Equation 1]}$$

In following step S27, work robot 1 performs the work based on first work coordinate W1 (X1, Y1). It should be noted that also in another work region 85 (not shown), the first work coordinate and the relative first work coordinate are generated in step S26, and the work by work robot 1 is performed in step S27. After that, the execution of the operation flow is returned to step S22.

In step S22 of second time, first target 8A for which the work has been completed is carried out, and second target 8A is carried in. In step S32 of second time, second recognition section 64 images second target 8A with fixed camera 4A to acquire second image data D23 shown in FIG. 12. In step S24 of second time, since second target 8A is the target, the execution of the operation flow proceeds to step S31.

Figure 12:
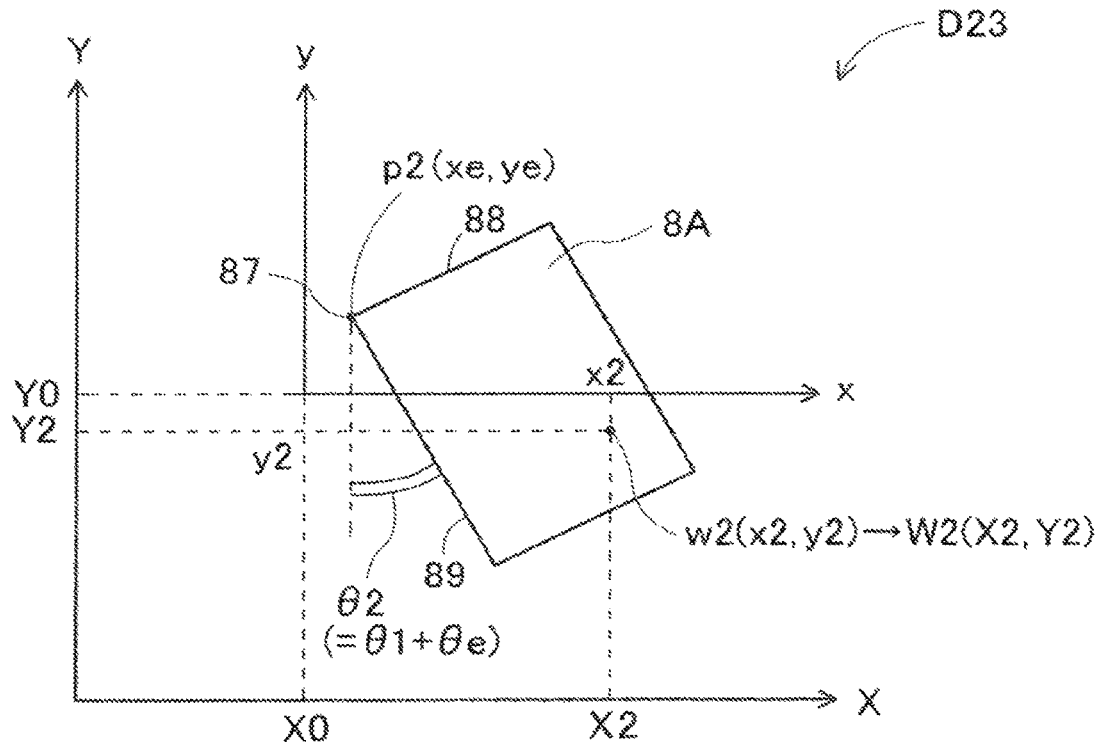
FIG. 12 is a graph of second image data showing an example of a second carry-in position of a second target.

In step S31, second recognition section 64 searches for a region in second image data D23 in the vicinity of first carry-in position p1 (0, 0) to recognize second carry-in position p2 of reference point 87 of second target 8A and second rotation angle 82 of second target 8A. Second carry-in position p2 is denoted as second carry-in position p2 (xe, ye) by using the relative coordinate system. In FIG. 12, the position error and the rotation error of second target 8A are exaggerated. Here, since first carry-in position p1 (0, 0) is the origin of the relative coordinate system, the coordinate value of second carry-in position p2 (xe, ye) represents the position error which is the difference between first carry-in position p1 and second carry-in position p2. Rotation error θe, which is the difference between first rotation angle θ1 and second rotation angle 82, is represented by (θ2−θ1).

In following step S32, second coordinate generation section 65 calculates relative second work coordinate w2 (x2, y2) which represents work region 85 of second target 8A by using relative first work coordinate w1 (x1, y1), xe and ye which correspond to the position error, and rotation error θe. The calculation is performed by Equation 2 below.

$$\begin{pmatrix} x2 \\ y2 \end{pmatrix} = \begin{pmatrix} \cos\theta e & -\sin\theta e \\ \sin\theta e & \cos\theta e \end{pmatrix} \begin{pmatrix} x1 \\ y1 \end{pmatrix} + \begin{pmatrix} xe \\ ye \end{pmatrix} \quad \text{[Equation 2]}$$

The first term (matrix arithmetic term) on the right side of Equation 2 represents correction relating to rotation error θe, and the second term on the right side represents correction relating to the position error. Further, second coordinate generation section 65 generates second work coordinate W2 (X2, Y2) of the reference coordinate system by converting relative second work coordinate w2 (x2, y2) into the reference coordinate system. The coordinate conversion is performed by Equation 3 below.

$$\begin{pmatrix} X2 \\ Y2 \end{pmatrix} = \begin{pmatrix} x2 \\ y2 \end{pmatrix} + \begin{pmatrix} X0 \\ Y0 \end{pmatrix} \quad \text{[Equation 3]}$$

After that, the execution of the operation flow is merged in step S27, and the work by work robot 1 is performed. It should be noted that also in another work region 85 (not shown), the second work coordinate are generated, and the work by work robot 1 is performed. After that, the execution of the operation flow is returned to step S22. In step S22 of third time, second target 8A for which the work has been completed is carried out, and third target 8A is carried in. Similar to the case of second target 8A, step S31 and step S32 are repeatedly executed on third and subsequent targets 8A.

In work coordinate generation device 6 according to the second embodiment, the time required for the search by second recognition section 64 is greatly shortened as compared with the first embodiment. On the other hand, the time required for the calculations of Equation 1 to Equation 3 is small. Accordingly, the time required to generate the work coordinates of second and subsequent targets 8A is shortened as compared with the first embodiment. As a result, the work efficiency of work robot 1 is further improved. This effect is more remarkable as the number of work regions 85 per target 8A is large.

6. Application Example of Second Embodiment

Hereinafter, an application example of the second embodiment will be described. In the application example, the individual differences in the arrangement positions of work regions 85 in multiple targets 8A are large and not negligible. Therefore, a failure occurs in a case in which work robot 1 performs the work on second and subsequent targets 8A based on second work coordinate W2 (X2, Y2) generated by second coordinate generation section 65.

Figure 13:
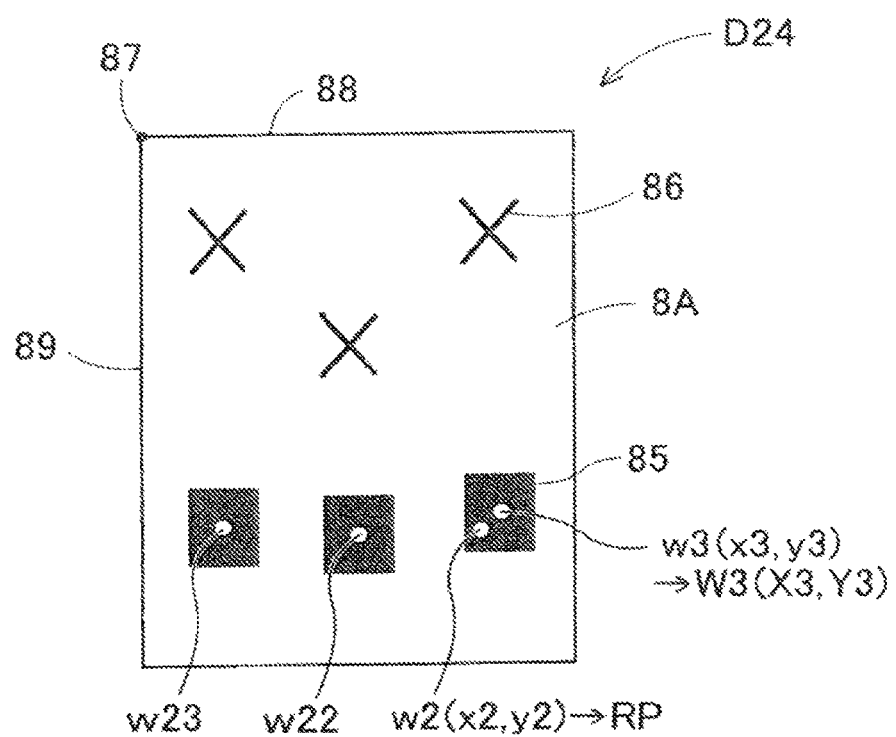
FIG. 13 is a diagram of the second image data for explaining the function of a second coordinate generation section in an application example of the second embodiment.

In a case of second image data D24 shown in FIG. 13, work regions 85 on the left side and the center are not affected by individual differences. Accordingly, relative second work coordinate w22 and relative second work coordinate w23 substantially coincide with the center point of work region 85. However, work region 85 on the right side is displaced in the upper right direction by the influence of the individual difference. Accordingly, relative second work coordinate w2 is deviated from the center point of work region 85.

Accordingly, second coordinate generation section 65 searches for work region 85 by using shape information 83. Specifically, second coordinate generation section 65 first sets relative second work coordinate w2 (x2, y2) as relative temporary coordinate RP. Next, second coordinate generation section 65 performs the search while gradually moving away from the priority search position corresponding to relative temporary coordinate RP in second image data D24 to recognize work region 85 corresponding to shape information 83.

Further, second coordinate generation section 65 generates true relative second work coordinate w3 (x3, y3) which represents work region 85 which is recognized. Further, second coordinate generation section 65 converts true relative second work coordinate w3 (x3, y3) into the reference coordinate system by using Equation 3 to generate second work coordinate W3 (X3, Y3) of the reference coordinate system. As a result, the work of work robot 1 is enabled.

It should be noted that the operation of second coordinate generation section 65 described above is similarly performed also on work region 85 on the left side and the center. According to the application example of the second embodiment, even in a case in which the individual differences in the arrangement positions of work regions 85 in multiple targets 8A, as well as the position error and the rotation error of target 8A in conveyance line 9 are not negligible, second work coordinate W3 (X3, Y3) can be reliably generated.

7. Applications and Modifications of Embodiments

In the first embodiment, work region 81 may be defined by using the boundary line of the regions. In this case, shape register section 61 recognizes work region 81 by using an image processing technology capable of recognizing the boundary line of the regions, and acquires shape information 83. Further, even in a case in which work region (81 and 85) and non-work region (82 and 86) of target (8 and 8A) have the same shape, the regions are applicable as long as the regions can be optically distinguished from each other with different colors and brightness. Further, fixed camera 4A may be used in the first embodiment, or camera 4 provided in hand section 23 may be used in the second embodiment.

Further, first recognition section 62 and second recognition section 64 can use a search tool other than the template. Further, in the application example of the second embodiment, second coordinate generation section 65 may convert relative second work coordinate w2 (x2, y2) into second work coordinate W2 (X2, Y2) in advance to obtain the temporary coordinates, and may perform the search by using shape information 83 in the reference coordinate system. In addition, the first and second embodiments are capable of various applications and modifications.

REFERENCE SIGNS LIST 1, 1A: work robot, 2: moving device, 3: end effector, 4: camera, 4A: fixed camera, 5: control device, 6: work coordinate generation device, 61: shape register section, 62: first recognition section, 63: first coordinate generation section, 64: second recognition section, 65: second coordinate generation section, 8, 8A: target, 81: work region, 82: non-work region, 83: shape information, 84: closed curve, 85: work region, 86: non-work region, 87: reference point, 88: short side, 89: long side, 9: conveyance line, D11, D12, D13: first image data, D21, D23, D24: second image data, P1, p1: first carry-in position, p2: second carry-in position, θ1: first rotation angle, θ2: second rotation angle, θe: rotation error, W1: first work coordinate, w1: relative first work coordinate, W2: second work coordinate, w2, w22, w23: relative second work coordinate, RP: relative temporary coordinate, w3: true relative second work coordinate

The invention claimed is:

1. A work robot, comprising:
   a moving arm configured to move an effector at an end of the moving arm, the effector performing work in a work region;
   a camera configured to image the work region; and
   a controller configured to
   register shape information about a shape of the work region, the work region being optically defined on a target which is carried in a work performing position to be a work target;
   acquire first image data by imaging a first target, which is carried in, with the camera and search for at least a part of a region in the first image data by using the shape information to recognize information about a position of the work region of the first target;
   generate a first work coordinate which represents the work region of the first target based on the region in the first image data;
   acquire second image data by imaging a second target, which is carried in, with the camera, and recognize information about a position of the work region of the second target by searching for a region in the second image data, which is narrower than the region in the first image data,
   generate a second work coordinate which represents the work region of the second target based on the first work coordinate and the work region of the second target, and
   control the moving arm and the effector to perform the work using the second work coordinate.

2. The work robot according to claim 1,
wherein the controller is configured to search for the region in the second image data in a vicinity of the first work coordinate to recognize the work region corresponding to the shape information, and
the controller is configured to correct the first work coordinate to generate the second work coordinate.

3. The work robot according to claim 1,
wherein there are individual differences in arrangement positions of the work regions in multiple targets which are carried in, and
the controller is configured to perform search while gradually moving away from a priority search position based on the first work coordinate in the second image data.

4. The work robot according to claim 1,
wherein the controller configured to register the shape information based on known design information of the target.

5. The work robot according to claim 1,
wherein the controller is configured to present the first image data to an operator and register the shape information in accordance with a designation of the operator.

6. The work robot according to claim 5,
wherein the controller is configured to recognize the shape of the work region and a shape of a non-work region which are optically defined in the first image data, present the recognized shapes to the operator, and register the shape information of the work region designated by the operator.

7. The work robot according to claim 6,
wherein the non-work region is a second work region that is a work target of a second work robot.

8. The work robot according to claim 5,
wherein the controller is configured to present the first image data to the operator, recognize the shape of the work region within a range designated by the operator in the first image data, and register the recognized shape.

9. The work robot according to claim 1,
wherein the work robot is part of a conveyance line in which a position error may occur at a carry-in position when the target is carried in the work performing position and a rotation error may occur in an orientation of the target, and uses a reference coordinate system determined in the work robot and a relative coordinate system based on the carry-in position of the first target.

10. The work robot according to claim 9,
wherein the controller is configured to perform search in the first image data to recognize the work region of the first target and recognize a first carry-in position of a reference point of the first target and a first rotation angle of the first target, the controller is configured to generate the first work coordinate of the reference coordinate system and generate a relative first work coordinate by converting the first work coordinate into the relative coordinate system having the first carry-in position as an origin, the controller is configured to search for the region in the second image data in a vicinity of the first carry-in position to recognize a second carry-in position of the reference point of the second target and a second rotation angle of the second target, and the controller is configured to calculate a relative second work coordinate of the relative coordinate system which represents the work region of the second target by using the relative first work coordinate, the position error which is a difference between the first carry-in position and the second carry-in position, and the rotation error which is a difference between the first rotation angle and the second rotation angle, and generate the second work coordinate of the reference coordinate system by converting the relative second work coordinate into the reference coordinate system.

11. The work robot according to claim 10, wherein the reference point is set at an end portion at which two sides of an outer shape of the target intersect with each other, the controller is configured to recognize the first rotation angle by obtaining a direction of the side, and the controller is configured to recognize the second rotation angle by obtaining the direction of the side.

12. The work robot according to claim 10, wherein there are individual differences in arrangement positions of the work regions in multiple targets which are carried in, and the controller is configured to define the relative second work coordinate as a relative temporary coordinate, perform search while gradually moving away from a priority search position based on the relative temporary coordinate in the second image data, recognize the work region corresponding to the shape information, generate a true relative second work coordinate which represents the recognized work region, and generate the second work coordinate of the reference coordinate system by converting the true relative second work coordinate into the reference coordinate system.

13. The work robot according to claim 1, wherein the camera is fixed and separate from the moving arm of the work robot.

* * * * *